United States Patent [19]

Kita et al.

[11] Patent Number: 5,426,470

[45] Date of Patent: Jun. 20, 1995

[54] LUMINANCE AND CHROMINANCE SIGNAL SEPARATION CIRCUIT EMPLOYING COMPARISON OF LEVEL DETECTED SIGNAL WITH A REFERENCE LEVEL

[75] Inventors: Kiroyuki Kita; Toshio Sarugaku, both of Chiba; Masaharu Tokuhara, Kanagawa, all of Japan

[73] Assignee: Sony Corporation, Tokyo, Japan

[21] Appl. No.: 126,188

[22] Filed: Sep. 24, 1993

[30] Foreign Application Priority Data

Sep. 30, 1992 [JP] Japan .................................. 4-285177

[51] Int. Cl.6 ............................................. H04N 9/78
[52] U.S. Cl. .................................. 348/668; 348/667
[58] Field of Search ................... 358/31, 21 R, 36, 37; H04N 9/78; 348/663, 664, 665, 667, 668

[56] References Cited

U.S. PATENT DOCUMENTS

| | | | |
|---|---|---|---|
| 4,880,737 | 12/1990 | Umezawa | 358/31 |
| 4,994,906 | 2/1991 | Moriwake | 358/31 |
| 5,016,092 | 5/1991 | Perlman | 358/31 |
| 5,051,818 | 9/1991 | Mishima | 358/31 |
| 5,093,715 | 3/1992 | Tokuhara et al. | 358/31 |
| 5,134,467 | 7/1992 | Kim | 358/31 |
| 5,146,317 | 9/1992 | Ishizu et al. | 358/31 |
| 5,173,768 | 12/1992 | Sowig et al. | 358/31 |
| 5,194,942 | 3/1993 | Sim et al. | 358/31 |
| 5,216,495 | 6/1993 | Suwald et al. | 358/31 |
| 5,220,413 | 6/1993 | Jeong | 358/31 |

*Primary Examiner*—Victor R. Kostak
*Assistant Examiner*—John W. Miller
*Attorney, Agent, or Firm*—Jay H. Maioli

[57] ABSTRACT

A luminance and chrominance signal separation circuit in which, when its comparing circuits decide that the level of high-frequency components of a luminance signal is lower than a predetermined level, a switching circuit, controlled by a control circuit, selects and outputs a chrominance signal output from a BPF processing circuit.

8 Claims, 6 Drawing Sheets

(a) FIRST LINE (b) SECOND LINE (c) FIRST LINE (d) SECOND LINE (e) FIRST LINE + SECOND LINE (WHEN HIGH-FREQUENCY COMPONENT IS PRESENT IN LUMINANCE SIGNAL)

(f) FIRST LINE + SECOND LINE (WHEN HIGH-FREQUENCY COMPONENT IS ABSENT IN LUMINANCE SIGNAL)

d 
NOISE e ———  f ——— g h ——— i   j

FIG. 8
(PRIOR ART)

d ———  e ———  f 
NOISE g ———  h i   j

LUMINANCE AND CHROMINANCE SIGNAL SEPARATION CIRCUIT EMPLOYING COMPARISON OF LEVEL DETECTED SIGNAL WITH A REFERENCE LEVEL

BACKGROUND OF THE INVENTION

1. Field of the Invention

The present invention relates to a Y/C separation circuit for separating a composite video signal into a luminance signal and a chrominance signal.

2. Description of the Related Art

There is known a Y/C separation circuit using a comb filter such as, for example, disclosed in Japanese Patent Application No. 2-137081.

Figure 5:
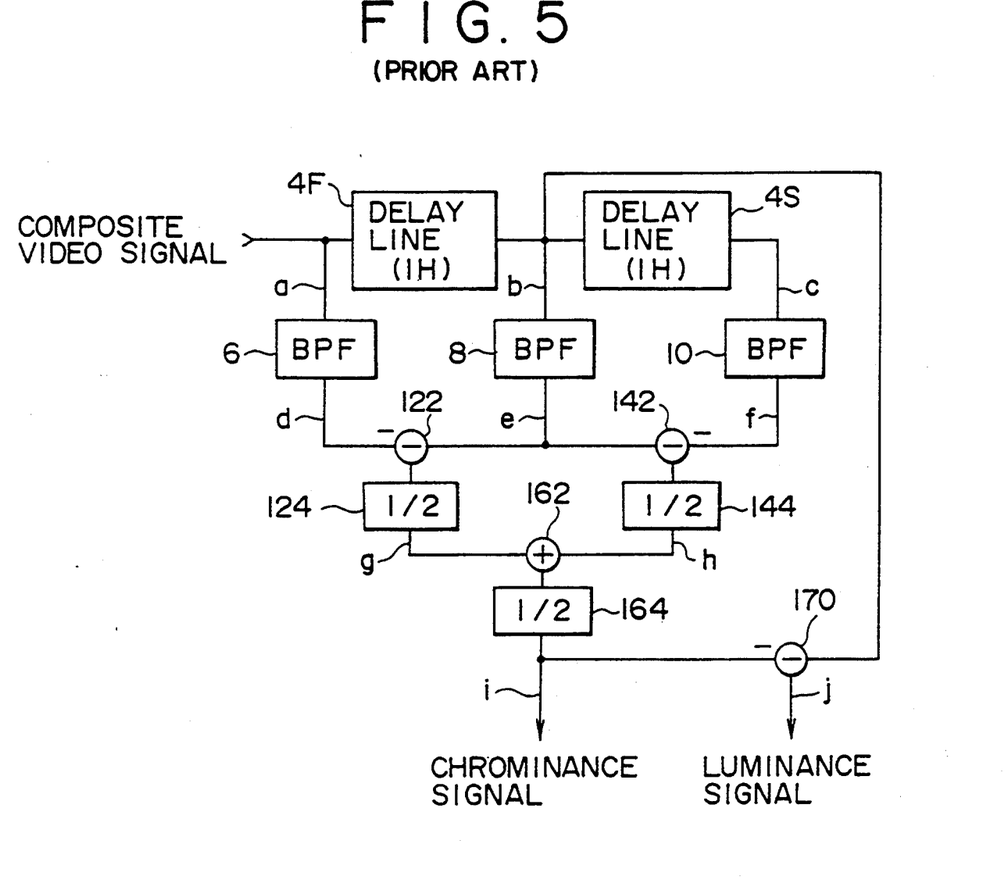
FIG. 5 is a block diagram showing an example of a conventional Y/C separation circuit.

FIG. 5 shows a Y/C separation circuit using a comb filter of a conventional technique. A 1 H (a period of one horizontal synchronization signal, or, briefly, one horizontal scanning period) delay line 4F outputs a composite video signal b obtained by delaying an input composite video signal a thereto by one horizontal scanning period, while a 1 H delay line 4S outputs a composite video signal c obtained by delaying the composite video signal b output from the 1 H delay line 4F by one horizontal scanning period. The input composite video signal a, the composite video signal b output from the 1 H delay line 4F, and the composite video signal c output from the 1 H delay line 4S correspond to the composite video signals for first, second, and third horizontal lines.

A bandpass filter (BPF) 6 extracts a signal d as a high-frequency component of the input composite video signal a. A bandpass filter 8 extracts a signal e as a high-frequency component of the composite video signal b output from the 1 H delay line 4F. A bandpass filter 10 extracts a signal f as a high-frequency component of the composite video signal c output from the 1 H delay line 4S.

A subtractor 122 subtracts the output signal d of the BPF 6 from the output signal e of the BPF 8, and a ½ (multiply by a half) circuit 124 outputs a signal g obtained by halving the output of the subtractor 122. A subtractor 142 subtracts the output signal f of the BPF 10 from the output signal e of the BPF 8, and a ½ circuit 144 outputs a signal h obtained by halving the output of the subtractor 142. An adder 162 adds up the signal g and the signal h, and a ½ circuit 164 outputs a signal obtained by halving the output signal of the adder 162, i.e., a chrominance signal i. A subtractor 170 subtracts the chrominance signal i from the composite video signal b output from the 1 H delay line 4F and outputs the difference as a luminance signal j.

Figure 6:
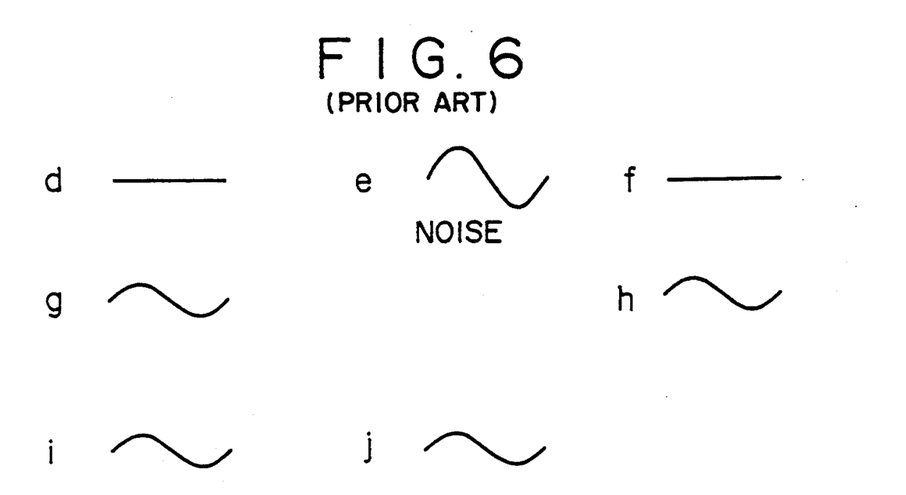
Figure 7:
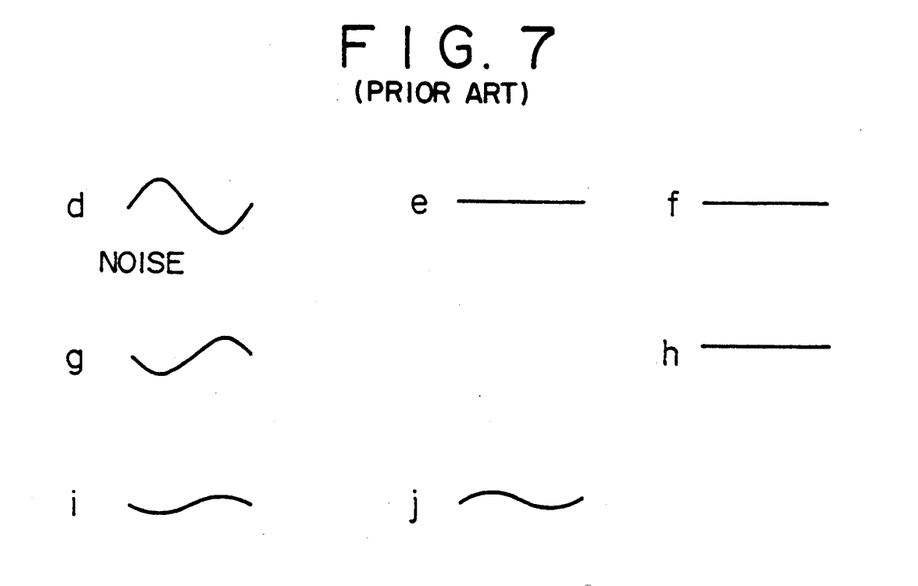
Figure 8:
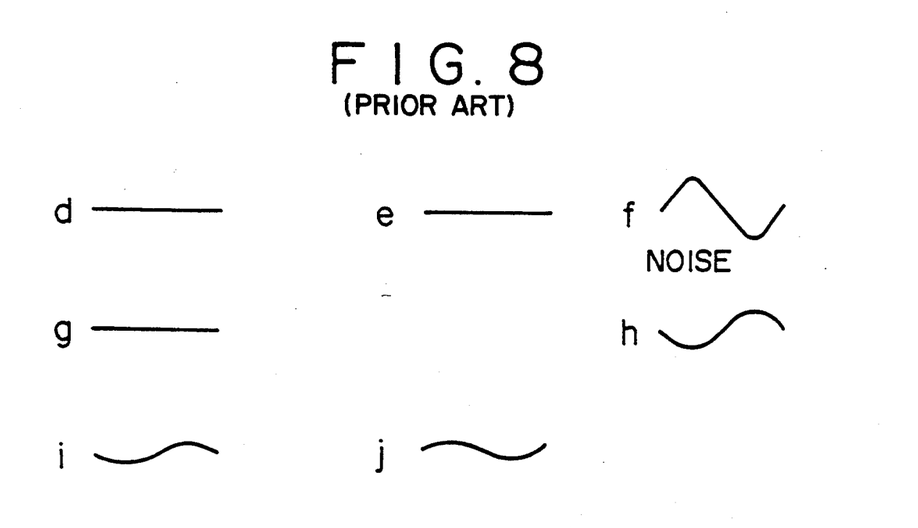

In the circuit of the conventional structure shown in FIG. 5, while the level of a random noise in the luminance signal j is reduced to ½, if a granular random noise is contained in the composite video signal a, there are produced noises in the outputs e, d, and f of the BPFs 8, 6, and 10 as shown in FIG. 6, FIG. 7, and FIG. 8, and as a result the random noise is spread over three horizontal lines vertically located in succession. Thus, there has been a problem that, while the noise level is lowered, the noise frequency is trebled.

When an NTSC signal is converted into a PAL signal in a broadcasting station, sometimes the carrier signal of the NTSC signal leaks out and becomes a low-level vertical line. Since this carrier signal is output from the j terminal the same as the luminance signal, it has been unable to be eliminated by the conventional circuit shown in FIG. 5.

When a trap filter is used instead of the above mentioned comb filter, an increase in noise can be prevented, but there arises a problem that the high-frequency component of the luminance signal becomes deteriorated.

SUMMARY OF THE INVENTION

The present invention has been made in view of the above described problems. Accordingly, an object of the present invention is to provide a Y/C separation circuit capable of decreasing both the noise level and the noise frequency without deteriorating the high-frequency component of the luminance signal.

According to one aspect of the present invention there is provided a luminance and chrominance signal separation circuit for video signal processing apparatus comprising:
first delay means for delaying a composite video signal;
second delay means connected to the first delay means serially;
first filter means connected to an input terminal of the first delay means;
second filter means connected to an input terminal of the second delay means;
third filter means connected to an output terminal of said second delay means; and
a level detection unit connected to output terminals of the first, second, and third filter means.

According to another aspect of the present invention there is provided a luminance and chrominance signal separation circuit for video signal processing apparatus comprising:
first delay means supplied with a composite video signal;
second delay means connected to the first delay means serially;
first filter means connected to an input terminal of the first delay means;
second filter means connected to an input terminal of the second delay means;
third filter means connected to an output terminal of the second delay means;
first subtractor means connected to an output terminal of the first filter means and an output terminal of the second filter means;
second subtractor means connected to the output terminal of the second filter means and an output terminal of the third filter means;
adder means connected to an output terminal of the first subtractor means and an output terminal of the second subtractor means; and
a switching circuit connected to the output terminal of the first subtractor means, the output terminal of the second subtractor means, and an output terminal of the adder means.

BRIEF DESCRIPTION OF THE DRAWINGS

FIG. 6 is a diagram showing signals at various portions of the conventional circuit of FIG. 5 when a noise is produced in an output e of one bandpass filter 8 due to a random noise contained in an input composite video signal a;

FIG. 7 is a diagram showing signals at various portions of the conventional circuit of FIG. 5 when a noise is produced in an output d of another bandpass filter 6 due to a random noise contained in the input composite video signal a; and FIG. 8 is a diagram showing signals at various portions of the conventional circuit of FIG. 5 when a noise is produced in an output f of another bandpass filter 10 due to a random noise contained in the input composite video signal a.

DESCRIPTION OF THE PREFERRED EMBODIMENT

Figure 1:
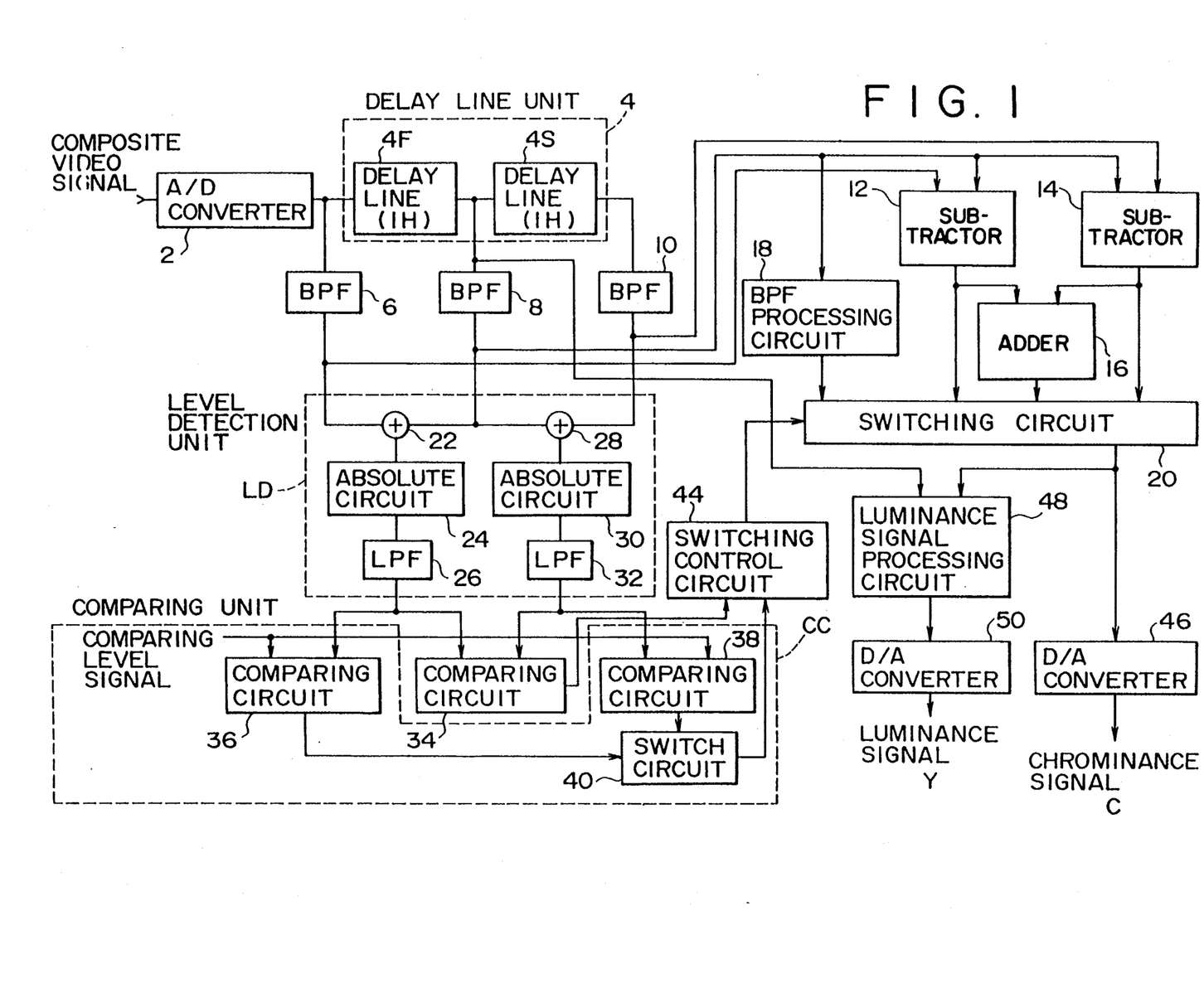
FIG. 1 is a block diagram showing a structure of an embodiment of a Y/C separation circuit according to the present invention.

FIG. 1 shows a structure of an embodiment of a Y/C separation circuit of the present invention. An input composite video signal is converted into a digital signal by an A/D converter 2. A delay line unit 4 is formed of a 1 H delay line 4F and a 1 H delay line 4S. The 1 H delay line 4F outputs a composite video signal obtained by delaying the digitized composite video signal by one horizontal scanning period, while the 1 H delay line 4S outputs a composite video signal obtained by delaying the composite video signal output from the 1 H delay line 4F by one horizontal scanning period. The input composite video signal, the composite video signal output from the 1 H delay line 4f, and the composite video signal output from the 1 H delay line 4S correspond to the composite video signal for the first, second, and third horizontal lines.

A BPF 6 extracts a signal of chrominance frequency band, i.e., a signal of high-frequency component, from the input composite video signal. A BPF 8 extracts a signal of chrominance frequency band, i.e., a signal of high-frequency component, from the composite video signal output from the 1 H delay line 4F. A BPF 10 extracts a signal of chrominance frequency band, i.e., a signal of high-frequency component, from the composite video signal output from the 1 H delay line 4S.

Figure 2:
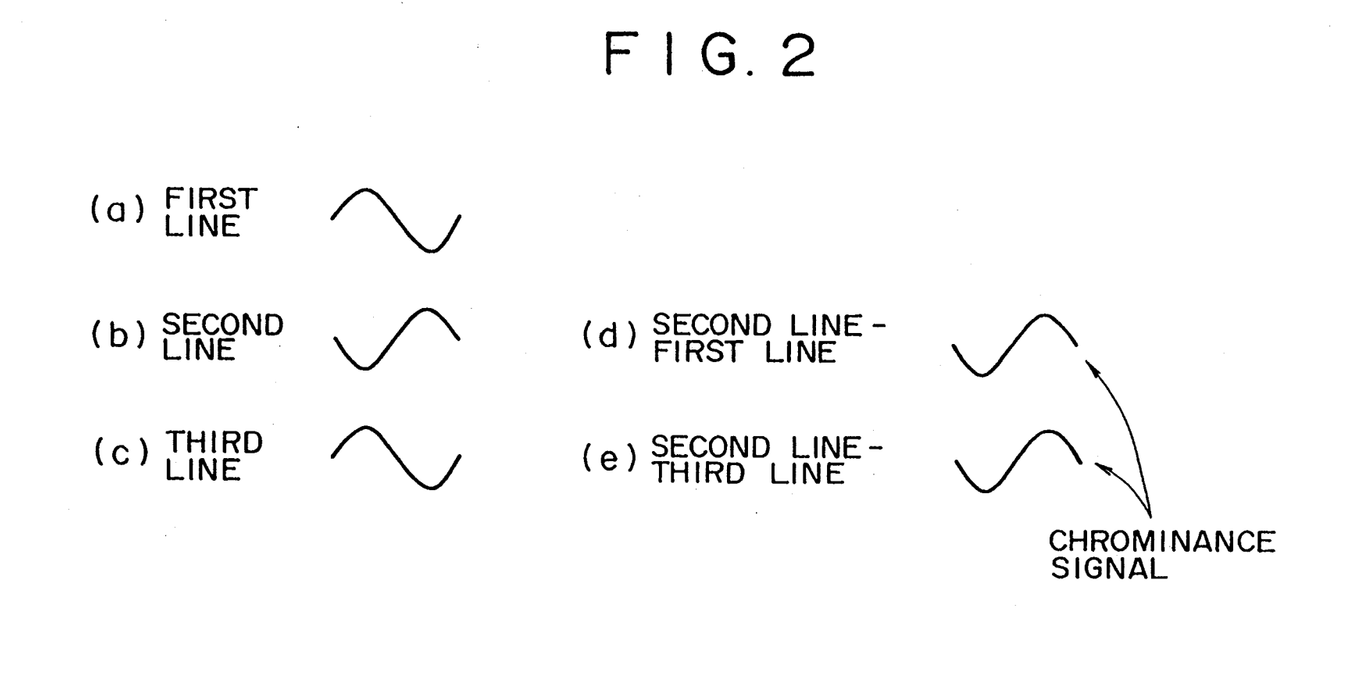
FIG. 2 is a diagram showing chrominance signals.

The subtractor and adder means of the embodiment shown in FIG. 1 are formed of subtractors 12 and 14 and an adder 16. The subtractor 12, receiving the output signal of the BPF 6 and the output signal of the BPF 8, subtracts the output signal of the BPF 6, i.e., the composite video signal for the first horizontal line (refer to FIG. 2(a)), from the output signal of the BPF 8, i.e., the composite video signal for the second horizontal line (refer to FIG. 2(b)), and outputs a chrominance signal (refer to FIG. 2(d)). The subtractor 14, receiving the output signal of the BPF 8 and the output signal of the BPF 10, subtracts the output signal of the BPF 10, i.e., the composite video signal for the third horizontal line (refer to FIG. 2(c)), from the output signal of the BPF 8, i.e., the composite video signal for the second horizontal line (refer to FIG. 2(b)), and outputs a chrominance signal (refer to FIG. 2(e)). Since the phase of the composite signal is inverted every line as shown in FIGS. 2(a), (b), and (c), the chrominance signal is obtained by the above described subtraction. The adder 16 adds up the output signals of the subtractors 12 and 14 and outputs a chrominance signal. By the addition, signal components other than the chrominance signal are eliminated. A BPF processing circuit 18 extracts a signal of a predetermined frequency band from the output signal of the BPF 8 to thereby output a chrominance signal. The frequency band for the BPF processing circuit 18 is selected to be an appropriate band not producing errors due to a sweep signal and the like. As described above, there are generated four types of chrominance signals in the embodiment of FIG. 1.

A level detection unit LD detects the level of a high-frequency component of the luminance signal included in the composite video signal. The level detection unit LD is formed of a first level detecting portion for detecting the level of the high-frequency component of the luminance signal in the composite video signal for the first and second horizontal lines and a second level detecting portion for detecting the level of the high-frequency component of the luminance signal in the composite video signal for the second and third horizontal lines.

Figure 3:
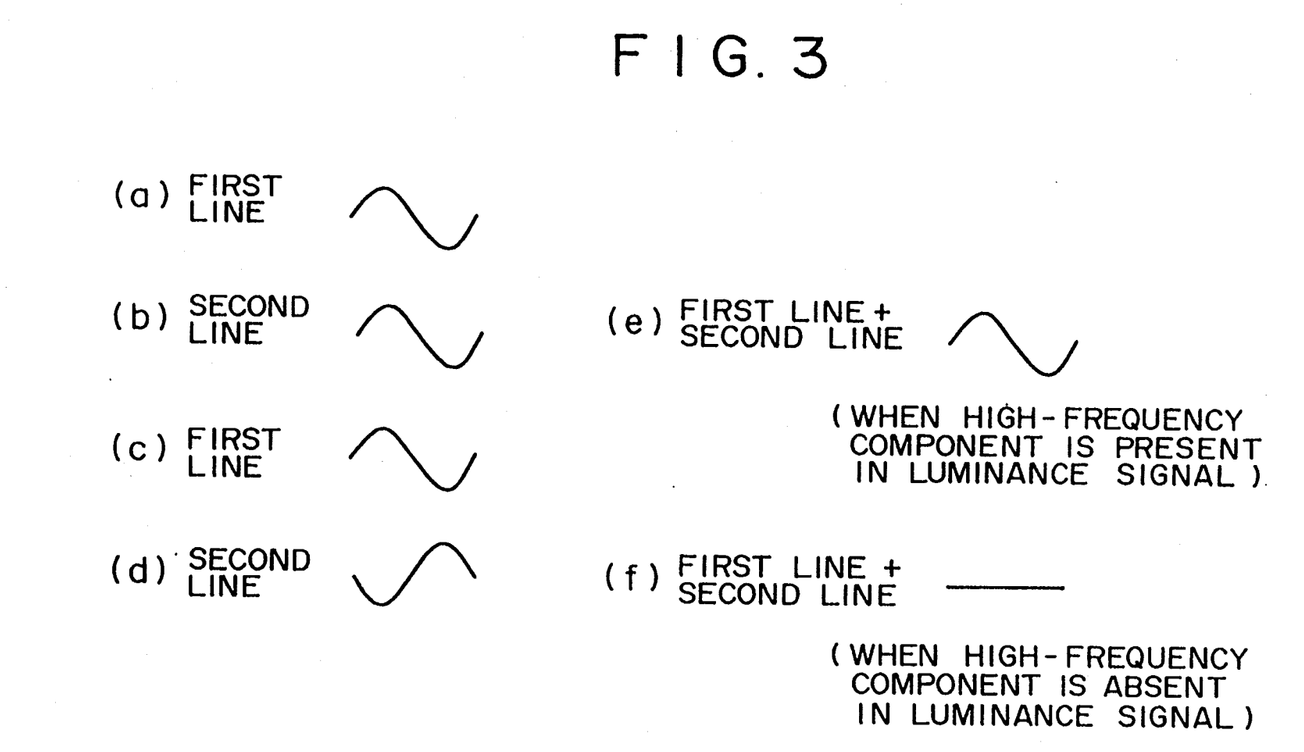
FIG. 3 is a diagram showing a high-frequency component of a luminance signal.

The first level detecting portion includes an adder 22 for adding up the output signal of the BPF 6, i.e., the signal for the first line of the composite video signal (refer to FIG. 3(a) or (c)), and the output signal of the BPF 8, i.e., the signal for the second line of the composite video signal (refer to FIG. 3(b) or (d)), an absolute circuit 24 for obtaining an absolute value of the output of the adder 22 (refer to FIG. 3(e) (when the high-frequency component is present in the luminance signal) or refer to FIG. 3(f) (when the high-frequency component is absent in the luminance signal)), and an LPF 26 for applying a low-pass filtering (LPF) treatment to the output signal of the absolute circuit 24.

The second level detecting portion includes an adder 28 for adding up the output signal of the BPF 8, i.e., the signal for the second line of the composite video signal, and the output signal of the BPF 10, i.e., the signal for the third line of the composite video signal, an absolute circuit 30 for obtaining an absolute value of the output of the adder 28, and an LPF 32 for applying a low-pass filtering (LPF) treatment to the output signal of the absolute circuit 30.

Figure 4:
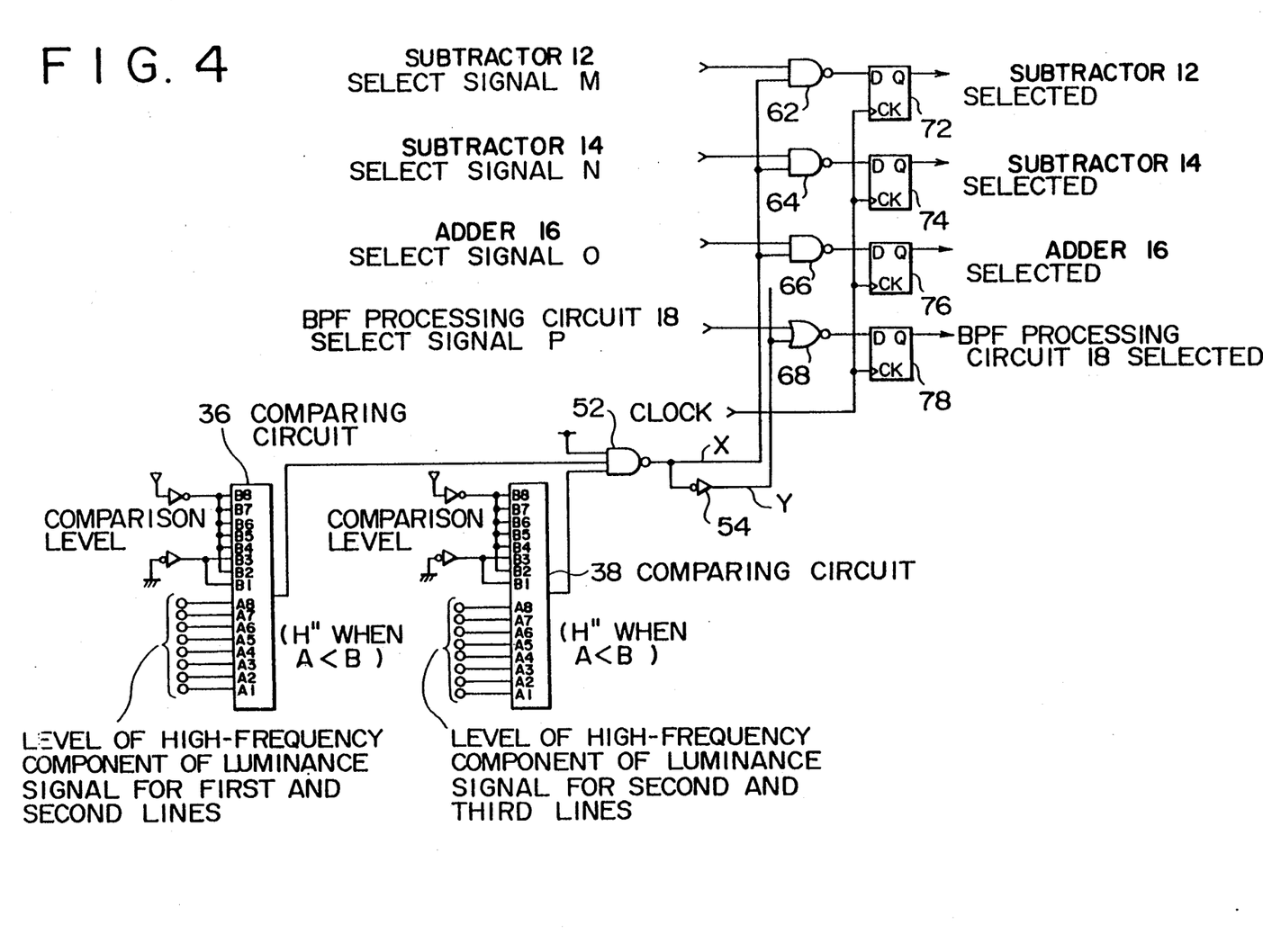
FIG. 4 is a block diagram showing an example of structure of comparing circuits 36 and 38, a switch circuit 40, and a switching control circuit 44 in the embodiment of FIG. 1.

A comparing circuit 34, receiving the output signals of the LPFs 26 and 32, i.e., the level of the high-frequency signal component of the luminance signal in the composite video signal for the first and second lines and the level of the high-frequency signal component of the luminance signal in the composite video signal for the second and third lines, outputs a select signal M of the subtractor 12 (refer to M in FIG. 4), a select signal N of the subtractor 14 (refer to N in FIG. 4), a select signal O of the adder 16 (refer to O in FIG. 4), or a select signal P of the BPF processing circuit 18 (refer to P in FIG. 4).

A comparing unit CC, shown in FIG. 1 and FIG. 4, includes comparing circuits 36 and 38 and a switch circuit 40 (denoted by reference numeral 52 in FIG. 4). The comparing circuit 36 decides whether or not the level of the high-frequency signal component of the luminance signal in the composite video signal for the first and second horizontal lines is lower than a predetermined comparison level. The comparing circuit 38 decides whether or not the level of the high-frequency signal component of the luminance signal in the composite video signal for the second and third horizontal lines is lower than a predetermined comparison level.

A switch circuit 40, receiving the results of comparison from the comparing circuits 36 and 38, when the level of the high-frequency signal component of the luminance signal for the first and second horizontal lines is lower than the predetermined level and when the level of the high-frequency signal component of the luminance signal for the second and third horizontal lines is lower than the predetermined level, outputs an instruction to select the chrominance signal output from the BPF processing circuit 18 (i.e., an instruction to select the trap filter). When at least one of the level of the high-frequency signal component of the luminance signal for the first-and second horizontal lines and the level of the high-frequency signal component of the luminance signal for the second and third horizontal lines is higher than the predetermined level, the switch circuit 40 outputs an enable signal to allow the select signal output from the comparing circuit 34 as it is to be accepted.

A switching control circuit 44, (which is denoted in FIG. 4 by reference numerals 62, 64, 66, 68, 72, 74, 76, and 78), is supplied with outputs of the comparing circuit 34 and the switch circuit 40. When the switch circuit 40 has output an instruction to select the chrominance signal output from the BPF processing circuit 18, the switching control circuit 44 outputs an instruction signal to a switching circuit 20 such that the BPF processing circuit 18 is selected. When the switch circuit 40 has output the enable signal, the content of the 2-line comb filter 12 select signal M, the 2-line comb filter 14 select signal N, the 3-line comb filter 16 select signal O, or the BPF processing circuit 18 select signal P as it is is output to the switching circuit 20.

FIG. 4 shows an example of structure of the comparing circuits 36 and 38, the switch circuit 40, and the switching control circuit 44 in the embodiment of FIG. 1. In this example, the switch circuit 40 is formed of a NAND gate 52 and an inverter 54, while the switching control circuit 44 is formed of NAND gates 62, 64, and 66, a NOR gate 68, and D flip-flops 72, 74, 76, and 78.

The comparing circuit 36 determines whether or not an 8-bit input A indicating the level of the high-frequency signal component of the luminance signal in the composite video signal for the first and second lines is lower than an 8-bit input B indicating a predetermined comparison level. The output of the comparing circuit 36 is input to a second input of the NAND gate 52. The comparing circuit 38 determines whether or not an 8-bit input A indicating the level of the high-frequency signal component of the luminance signal in the composite video signal for the second and third lines is lower than an 8-bit input B indicating a predetermined comparison level. The output of the comparing circuit 38 is input to a third input of the NAND gate 52. The first input of the NAND gate 52 is supplied with an "H" level.

The inputs on one side of the NAND gates 62, 64, and 66 and the NOR gate 68 are supplied with the select signal M of the subtractor 12, the select signal N of the subtractor 14, the select signal O of the adder 16, and the select signal P of the BPF processing circuit 18, respectively. The inputs on the other side of the NAND gates 62, 64, and 66 is supplied with an output X of the NAND gate 52. The input on the other side of the NOR gate 68 is supplied with an output Y of the inverter 54 obtained by inverting the output of the NAND gate 52.

The outputs of the NAND gates 62, 64, and 66 and the NOR gate 68 are supplied to the D inputs of the D flip-flops 72, 74, 76, and 78, respectively. When the Q output of any of the D flip-flops 72, 74, 76, and 78 is "L" it indicates that the corresponding subtractor 12, subtractor 14, adder 16, or the BPF processing circuit 18 should be selected.

The operation of the circuits shown in FIG. 4 will be described below. When the level of the high-frequency signal component of the luminance signal for the first and second lines is lower than a predetermined comparison level, for example "5", the comparing circuit 36 outputs an "H" output. When the level of the high-frequency signal component of the luminance signal for the second and third lines is lower than a predetermined comparison level, for example "5", the comparing circuit 38 outputs an "H" output. The fact that the outputs of the comparing circuits 36 and 38 are both "H" indicates that luminance signal for successive lines are flat and have no level difference therebetween.

When the outputs of the comparing circuits 36 and 38 are both "H", the output X of the NAND gate 52 becomes "L" and the output Y of the inverter 54 becomes "H". Accordingly, the outputs of the NAND gates 62, 64, and 66 all becomes "H", while the output of the NOR gate 68 becomes "L". Hence, the outputs of the D flip-flops 72, 74, and 76 all become "H", while the output of the D flip-flop 78 becomes "L", and thereby the BPF processing circuit 18 is forcedly selected.

When at least one of the level of the high-frequency signal component of the luminance signal for the first and second lines and the level of the high-frequency signal component of the luminance signal for the second and third lines is higher than the predetermined comparison level, at least one of the outputs of the comparing circuits 36 and 38 becomes "L". Accordingly, the output X of the NAND gate 52 becomes "H" and the output Y of the inverter 54 becomes "L". As a result, the outputs of the NAND gates 62, 64, and 66 and the NOR gate 68 come to reflect the select signal M of the subtractor 12, the select signal N of the subtractor 14, the select signal O of the adder 16, and the select signal P of the BPF processing circuit 18, as it is, respectively. More specifically, the NAND gates 62, 64, and 66 and the NOR gate 68, when receiving the select signal M ("H") of the subtractor 12, the select signal N ("H") of the subtractor 14, the select signal O ("H") of the adder 16, and the select signal P ("H") of the BPF processing circuit 18, respectively, provide an "L" output. Accordingly, the D flip-flop 72, 74, 76, or 78 whose D input is "L" provides an "L" output.

Referring back to FIG. 1, the switching circuit 20 selectively outputs one of the chrominance signals output from the subtractor 12, subtractor 14, adder 16, and the BPF processing circuit 18 corresponding to the output of the switching control circuit 44.

A D/A converter 46 converts the chrominance signal selected by the switching circuit 20 into an analog signal and outputs this signal. A luminance signal processing circuit 48 subtracts the chrominance signal selected by the switching circuit 20 from the composite video signal output from the 1-H delay line 4F and outputs the thus obtained luminance signal. A D/A converter 50 converts the luminance signal output from the luminance signal processing circuit 48 into an analog signal and outputs this signal.

As described above, when the level of the high-frequency component of the luminance signal is low in the embodiment shown in FIG. 1 to FIG. 4, the chrominance signal from the BPF processing circuit 18 is selected (i.e., the trap filter is switch selected). When the high-frequency component of the luminance signal is zero, the luminance signal is flat and has no difference between lines, and therefore, even if the chrominance signal from the BPF processing circuit 18 is selected (if the trap filter is switch selected) there is produced no deterioration in the high-frequency component of the luminance signal. When a noise is input, the level of the noise is low, and therefor, by setting the comparison level in the comparing circuits 36 and 38 to an appropriate value, it is achieved to cause the chrominance signal from the BPF processing circuit 18 to be selected (the trap filter to be switch selected) only for the pixel in which the noise is present, so that the noise level is lowered by the filter, the noise is prevented from vertically expanding on the picture screen (i.e., it is prevented from spreading over other horizontal lines), and the noise frequency is reduced to ½. When there is a high-frequency component of the luminance signal, a subtractor/adder means is selected so that a signal deterioration is prevented from occurring. Thus, by performing the above described switch selection, a dot crawl can be prevented from occurring at a noncorrelative portion located in the vertical direction.

The NTSC carrier signal, which can leak out when an NTSC signal is converted to a PAL signal in a broadcasting station, produces a low-level vertical line on the picture screen. Such a signal can be eliminated by setting the comparison level in the comparing circuits 36 and 38 to an appropriate value so that the chrominance signal from the BPF processing circuit 18 is selected (the trap filter is switch selected). Since such a leakage signal is contained in the same component as the luminance signal, it has been unremovable by a conventional comb filter. However, since it is of a low level, it can be removed by the above embodiment.

The embodiment is also applicable to the PAL signal by replacing the 1-H delay lines 4F and 4S with 2-H delay lines.

Since it is adapted in the Y/C separation circuit according to the present invention such that a chrominance signal as the output of bandpass filter means is selected and output when the level of the high-frequency component of a luminance signal is lower than a predetermined level, the noise frequency can be reduced as compared with that in the conventional Y/C separation circuit while the high-frequency component of the luminance signal is not deteriorated and the noise level is equally lowered. More specifically, when the level of the high-frequency component of the luminance signal is low, the high-frequency component is not deteriorated even if the chrominance signal is generated by means of a bandpass filter (i.e., even if a trap filter is switch selected). Further, when a chrominance signal is generated by means of the bandpass filter, the noise is prevented from expanding in the vertical direction, i.e., from spreading over a plurality of horizontal lines, and hence the noise frequency is reduced. When the level of the high-frequency component of the luminance signal is high, a chrominance signal is generated by subtractor/adder means, and therefore, no signal deterioration is produced. Further, the NTSC carrier signal leaking out when an NTSC signal is converted to a PAL signal in a broadcasting station which has been unremovable by conventional Y/C separation circuits can be removed by the Y/C separation circuit of the present invention.

What is claimed is:

1. A luminance and chrominance signal separation circuit for video signal processing apparatus comprising:
   first delay means supplied with a composite video signal;
   second delay means connected to said first delay means serially;
   first filter means connected to an input terminal of said first delay means;
   second filter means connected to an input terminal of said second delay means;
   third filter means connected to an output terminal of said second delay means;
   fourth filter means connected to an output terminal of said second filter means;
   first subtractor means connected to an output terminal of said first filter means and the output terminal of said second filter means;
   second subtractor means connected to the output terminal of said second filter means and an output terminal of said third filter means;
   adder means connected to an output terminal of said first subtractor means and an output terminal of said second subtractor means;
   level detection means connected to respective output terminals of said first, second, and third filter means;
   comparing means for comparing a plurality of output signals from said level detection means with a predetermined reference level and for comparing the plurality of output signals with each other and producing a comparison result signal; and
   a switching circuit connected to the output terminal of said first subtractor means, the output terminal of said second subtractor means, an output terminal of said adder means, and an output terminal of said fourth filter means for selectively providing a signal from said first subtractor means, a signal from said second subtractor means, a signal from said adder means, or a signal from said fourth filter means in response to the comparison result signal from said comparing means.

2. A luminance and chrominance signal separation circuit for video signal processing apparatus as claimed in claim 1, wherein said level detection means further comprises:
   second adder means for adding signals from said first and second filter means at its input terminals;
   third adder means for adding signals from said second and third filter means at its input terminals;
   a first absolute value circuit for creating an absolute value of an output signal of said second adder means;
   a second absolute value circuit for creating an absolute value of an output signal of said third adder means;
   first low-pass filter means connected to an output terminal of said first absolute value circuit; and
   second low-pass filter means connected to an output terminal of said second absolute value circuit.

3. A luminance and chrominance signal separation circuit for video signal processing apparatus as claimed in claim 1, wherein said comparing means further comprises:
   a first comparing circuit for comparing the level of an output of said first low-pass filter with the predetermined reference level;

a second comparing circuit for comparing the level of an output of said second low-pass filter with the predetermined reference level;

a third comparing circuit for comparing the level of the output of said first low-pass filter with the level of the output of said second low-pass filter and for providing a low-pass filter comparison output;

a switch circuit for switching output signals of said first and second comparing circuits and for providing a first switched output; and a switching control circuit receiving the first switched output and the low-pass filter comparison output and for providing a switching control signal to said switching circuit.

4. A luminance and chrominance signal separation circuit for video signal processing apparatus as claimed in claim 3, wherein said switch circuit comprises a NAND gate.

5. A luminance and chrominance signal separation circuit for video signal processing apparatus as claimed in claim 3, wherein said switching control circuit comprises plural logic gate circuits and plural flip-flop circuits.

6. A luminance and chrominance signal separation circuit for video signal processing apparatus as claimed in claim 1, further comprising:

a luminance signal processing circuit for processing an output signal of said switching circuit and an output signal of said first delay means.

7. A luminance and chrominance signal separation circuit for video signal processing apparatus as claimed in claim 6, further comprising:

analog-to-digital converter means for converting the input signal to said first delay means;

first digital-to-analog converter means for converting an output signal of said luminance signal processing circuit; and second digital-to-analog converter means for converting an output signal of said switching circuit.

8. A luminance and chrominance signal separation circuit for video signal processing apparatus as claimed in claim 1, wherein the delay time of said first and second delay means substantially equals a period of one horizontal synchronization signal.

* * * * *